United States Patent
Vaidya et al.

(10) Patent No.: US 10,872,231 B2
(45) Date of Patent: Dec. 22, 2020

(54) SYSTEMS AND METHODS OF ACTIVITY BASED RECORDING FOR CAMERA APPLICATIONS

(71) Applicant: Ooma, Inc., Sunnyvale, CA (US)

(72) Inventors: Govind Vaidya, San Mateo, CA (US); Behnam Nader, San Mateo, CA (US); Shaival Shah, San Mateo, CA (US)

(73) Assignee: OOMA, INC., Sunnyvale, CA (US)

( * ) Notice: Subject to any disclaimer, the term of this patent is extended or adjusted under 35 U.S.C. 154(b) by 0 days.

(21) Appl. No.: 16/175,726

(22) Filed: Oct. 30, 2018

(65) Prior Publication Data

US 2019/0141297 A1    May 9, 2019

Related U.S. Application Data

(60) Provisional application No. 62/585,686, filed on Nov. 14, 2017, provisional application No. 62/583,875, (Continued)

(51) Int. Cl.
*G06K 9/00* (2006.01)
*G08B 13/196* (2006.01)
(Continued)

(52) U.S. Cl.
CPC ..... *G06K 9/00288* (2013.01); *G06K 9/00228* (2013.01); *G06K 9/00268* (2013.01);
(Continued)

(58) Field of Classification Search
CPC ........ G08B 13/19656; G08B 13/19695; G08B 13/19671; G08B 13/19663;
(Continued)

(56) References Cited

U.S. PATENT DOCUMENTS 6,831,556 B1 * 12/2004 Boykin .................. H04N 7/181
340/539.1
7,129,872 B1    10/2006 Qvortrup et al.
(Continued)

OTHER PUBLICATIONS

Vaidya, Govind, "Automatic Object Detection and Recognition via a Camera System", U.S. Appl. No. 16/163,521, filed Oct. 17, 2018, 40 pages.
(Continued)

*Primary Examiner* — Hung Q Dang
(74) *Attorney, Agent, or Firm* — Carr & Ferrell LLP

(57) ABSTRACT

Systems and methods for activity based recording by a smart camera system are described herein. Activity based recording provides a smart and automated method to enable and disable the camera recording, such that potentially significant events or activities are detected and recorded. A camera located in a physical space detects a triggering event and begins recording video and/or audio for a predetermined time period, resulting in a captured video. The triggering event may be detected by one or more sensors associated with the camera, including but not limited to, a camera sensor, a passive infrared sensor, and a microphone. A metadata file is added to the captured video. Certain video frames are added to the beginning of the captured video, resulting in a finalized video recording. The finalized video recording is transmitted and presented to a user computing device.

22 Claims, 7 Drawing Sheets

Related U.S. Application Data filed on Nov. 9, 2017, provisional application No. 62/582,919, filed on Nov. 7, 2017.

(51) Int. Cl.

| | | |
|---|---|---|
| *H04N 7/18* | (2006.01) | |
| *H04N 5/91* | (2006.01) | |
| *H04N 5/77* | (2006.01) | |
| *H04N 9/82* | (2006.01) | |
| *H04N 5/232* | (2006.01) | |
| *H04R 1/04* | (2006.01) | |
| *H04R 1/32* | (2006.01) | |
| *G11B 27/036* | (2006.01) | |
| *G10L 25/51* | (2013.01) | |

(52) U.S. Cl.
CPC ... *G06K 9/00718* (2013.01); *G08B 13/19695* (2013.01); *G10L 25/51* (2013.01); *G11B 27/036* (2013.01); *H04N 5/23241* (2013.01); *H04N 5/23245* (2013.01); *H04N 5/77* (2013.01); *H04N 5/772* (2013.01); *H04N 5/91* (2013.01); *H04N 7/183* (2013.01); *H04N 7/188* (2013.01); *H04N 9/8205* (2013.01); *H04R 1/04* (2013.01); *H04R 1/326* (2013.01); *G06K 9/00221* (2013.01); *G06K 9/00771* (2013.01); *G08B 13/19671* (2013.01); *H04R 2499/11* (2013.01)

(58) Field of Classification Search
CPC ............ G08B 13/19682; G08B 13/196; G08B 13/19608; G08B 13/19669; G08B 13/19641; G06K 9/00771; H04N 5/77; H04N 7/185; H04N 5/23245; H04N 5/2253; H04N 5/23203; H04N 7/181; H04N 5/2252; H04N 5/23206; H04N 7/183; H04N 7/18; H04N 5/232; H04N 5/247; H04N 5/2258; H04N 5/772; H04N 5/23241
USPC .................. 386/226–230, 239–248
See application file for complete search history.

(56) References Cited

U.S. PATENT DOCUMENTS

| | | | | |
|---|---|---|---|---|
| 7,859,571 | B1* | 12/2010 | Brown | G08B 13/19669 |
| | | | | 348/211.3 |
| 9,906,722 | B1* | 2/2018 | Gigot | H04N 5/23241 |
| 10,115,029 | B1* | 10/2018 | Day | G06K 9/00832 |
| 10,372,995 | B2 | 8/2019 | Zhang et al. | |
| 2004/0247284 | A1 | 12/2004 | Yamasaki | |
| 2006/0221184 | A1* | 10/2006 | Vallone | G08B 13/19682 |
| | | | | 348/155 |
| 2007/0035632 | A1* | 2/2007 | Silvernail | G07C 5/085 |
| | | | | 348/211.3 |
| 2007/0185989 | A1 | 8/2007 | Corbett et al. | |
| 2008/0224862 | A1 | 9/2008 | Cirker | |
| 2008/0278580 | A1* | 11/2008 | Bentkovski | H04N 5/23203 |
| | | | | 348/143 |
| 2008/0297602 | A1 | 12/2008 | Chang | |
| 2008/0319604 | A1 | 12/2008 | Follmer et al. | |
| 2010/0287053 | A1 | 11/2010 | Ganong et al. | |
| 2013/0215266 | A1* | 8/2013 | Trundle | G08B 13/19602 |
| | | | | 348/143 |
| 2014/0328578 | A1* | 11/2014 | Shafron | H04N 21/63 |
| | | | | 386/328 |
| 2015/0286875 | A1* | 10/2015 | Land | G11B 27/10 |
| | | | | 382/103 |
| 2015/0358537 | A1* | 12/2015 | Mirza | G06T 7/0002 |
| | | | | 348/231.99 |
| 2016/0050396 | A1* | 2/2016 | Gali | H04N 7/181 |
| | | | | 348/159 |
| 2016/0105644 | A1* | 4/2016 | Smith | H04N 5/23206 |
| | | | | 348/159 |
| 2016/0253883 | A1 | 9/2016 | Westmacott et al. | |
| 2016/0277759 | A1* | 9/2016 | Edpalm | G08B 25/08 |
| 2017/0154638 | A1 | 6/2017 | Hwang et al. | |
| 2017/0339343 | A1* | 11/2017 | Zhang | H04N 5/23241 |
| 2017/0358322 | A1* | 12/2017 | Wiklof | G11B 27/005 |
| 2017/0374284 | A1* | 12/2017 | Shao | H04N 7/185 |
| 2018/0206043 | A1 | 7/2018 | Gabai | |
| 2018/0268674 | A1 | 9/2018 | Siminoff | |
| 2019/0138795 | A1 | 5/2019 | Vaidya | |
| 2019/0141298 | A1 | 5/2019 | Vaidya et al. | |

OTHER PUBLICATIONS

Houldings, David, "High Sensitivity Arduino Sound Level Detector," Internet of Things [Online], Feb. 17, 2014 [retrieved on Oct. 30, 2019] Retrieved from the Internet: <http://davidhoulding.blogspot.com/2014/02/simple-high-sensitivity-arduino-sound.html>, 7 pages.

* cited by examiner

SYSTEMS AND METHODS OF ACTIVITY BASED RECORDING FOR CAMERA APPLICATIONS

CROSS-REFERENCE TO RELATED APPLICATIONS

The present utility patent application claims the priority benefit under 35 U.S.C. 119(e) of U.S. Provisional Application No. 62/582,919, filed on Nov. 7, 2017, and entitled "Activity Based Recording (ABR) for Camera Applications." The present utility patent application also claims the priority benefit under 35 U.S.C. 119(e) of U.S. Provisional Application No. 62/585,686, filed on Nov. 14, 2017, and entitled "Unique Method to Detect Faces in Videos and Process Selective Frames in Recorded Videos to Recognize and Analyze Faces for Camera Applications." Further, the present utility patent application claims the priority benefit under 35 U.S.C. 119(e) of U.S. Provisional Application No. 62/583,875, filed on Nov. 9, 2017 and entitled "Sound Detection Sensing Logic for Camera Applications." The present utility patent application is also related to U.S. Nonprovisional patent application Ser. No. 16/163,521, filed on Oct. 17, 2018, and entitled "Automatic Object Detection and Recognition Via a Camera System," which claims the priority benefit under 35 U.S.C. 119(e) of U.S. Provisional Application No. 62/585,686, filed on Nov. 14, 2017, and entitled "Unique Method to Detect Faces in Videos and Process Selective Frames in Recorded Videos to Recognize and Analyze Faces for Camera Applications." The present utility patent application is further related to U.S. Nonprovisional patent application Ser. No. 16/182,483, filed on Nov. 6, 2018, and entitled "Activity Based Video Recording" which claims the priority benefit under 35 U.S.C. 119(e) of U.S. Provisional Application No. 62/583,875, filed on Nov. 9, 2017 and entitled "Sound Detection Sensing Logic for Camera Applications." The disclosure of the above-mentioned applications is hereby incorporated by reference herein in its entirety, including all references and appendices cited therein.

TECHNICAL FIELD

The present disclosure relates to activity-based recording via camera hardware and software.

BACKGROUND

Traditional security cameras have been utilized for surveillance of physical spaces. Typically, such conventional cameras record video of a space for the entire time they are on, which may be twenty-four hours a day, seven days a week. Thus, because of this continuous recording of surveillance of physical spaces, enormous amounts of video data are produced and must be stored, which can prove to be costly. Also, the enormous amounts of video data produced by conventional security cameras will require hours and hours of human review of the video data, which is also costly and time-consuming. Furthermore, the human review of the video data can turn out to be fruitless, because such a human review may ultimately show that no significant event happened in the physical space for the time period reviewed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A system for activity based recording via a camera system is disclosed. The system comprises a camera and a video analysis system. The camera comprises: a lens; a camera sensor; a passive infrared (PIR) sensor; a microphone; a first processor and a first memory, the first processor configured to cause the camera to enter a low power mode, detect a triggering event in a physical space around the camera based upon data received from one or more of the camera sensor, the PIR sensor and the microphone, cause the camera to enter a capture video mode, record video for a predetermined time period, in response to detecting the triggering event, resulting in a captured video, add a metadata file to the captured video, and transmit the captured video with a metadata file associated with the captured video, the metadata file including data received from the one or more of the camera sensor, the PIR sensor and the microphone, to a video analysis system in communication with the camera. The video analysis system comprises a second processor and second memory, the second processor configured to receive the transmitted captured video and the metadata file from the camera, examine the captured video, based on information in the metadata file, add video frames to the captured video, resulting in a finalized video recording, and transmit and display the finalized video recording to a user computing device in communication with the video analysis system.

A method for activity based recording via a camera system is also disclosed. The camera system includes a camera, a camera sensor, a passive infrared (PIR) sensor, and a microphone. The method comprises: causing the camera to enter a low power mode; detecting a triggering event in a physical space around the camera based upon data received from one or more of the camera sensor, the PIR sensor and the microphone; causing the camera to enter a capture video mode; recording video for a predetermined time period, in response to detecting the triggering event, resulting in a captured video; adding a metadata file to the captured video; transmitting the captured video with a metadata file associated with the captured video, the metadata file including data received from the one or more of the camera sensor, the PIR sensor and the microphone; receive the transmitted captured video and the metadata file from the camera; examining the captured video, based on information in the metadata file; resulting in a finalized video recording; and transmitting and displaying the finalized video recording to a user computing device in communication with the camera.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
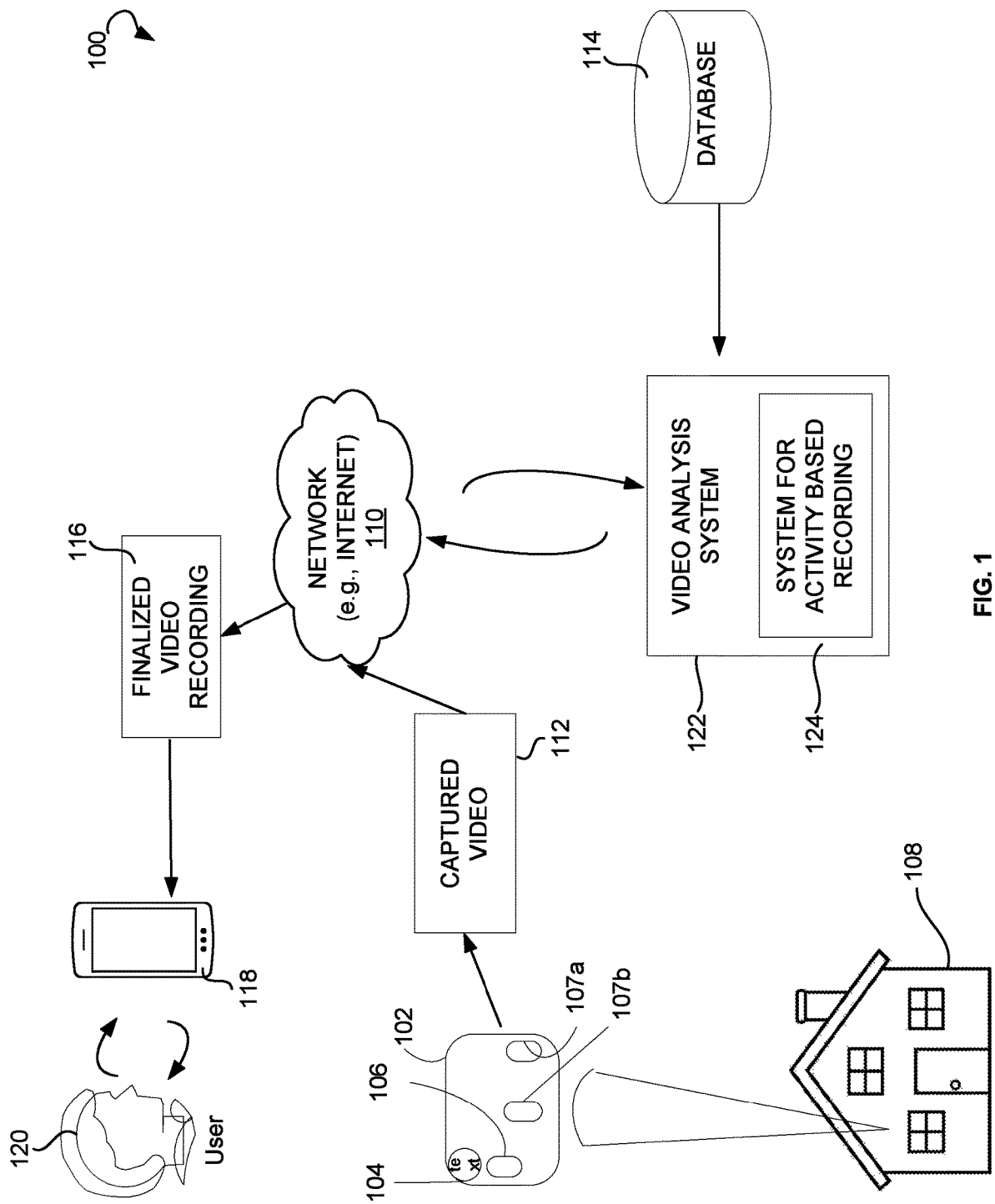
FIG. 1 illustrates an environment within which systems and methods for activity based recording for camera applications can be implemented, according to an example embodiment.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The disclosure relates to a system and methods for activity based recording for camera applications. Instead of recording 24 hours a day, an exemplary camera system for activity based recording includes a camera that has the intelligence to determine when it should record and when it should not record. In some exemplary embodiments, the camera as a source can determine when a significant event or activity is occurring which requires camera recording.

Activity Based Recording (ABR) provides a smart and automated method to enable and disable the camera recording, such that potentially significant events or activities are detected and recorded. After recording the potentially significant event or activity, the ABR camera system will restore the camera to a low power state, which will reduce the power consumption of the device, until the arrival of the next significant event. Due to the automated nature of ABR, it is particularly useful in situations where the camera is unattended, especially in cases where the camera and the camera user are not colocated.

More specifically, the camera system allows a consumer-friendly camera to be deployed in a physical space, such as a house, office building, or other room. The camera, through use of specially designed hardware and specially programmed software, can record short video clips when a triggering event is detected by one or more sensors on the camera, such as the camera sensor (also known as the image sensor), sound circuitry in a microphone on the camera and/or a passive infrared (PIR) sensor. This method provides a smart and automated way to enable and disable a camera recording, so that only potentially significant events are detected and recorded, thus obviating the need for many hours of recorded video of an empty room with no activity occurring.

In some embodiments, in the exemplary camera system, the camera "listens" for a trigger that indicates that the camera should begin recording. Instead of recording video 24 hours a day, the camera will build intelligence which is stored as instructions to be processed by a processor, and by way of this intelligence, it can determine if a significant event is occurring that requires or warrants a video recording or for the camera recorder to turn on, based on the data it receives from the one or more sensors. The one or more sensors may send data to the camera that they have been activated (by image, by sound, by motion, etc). In some embodiments, the camera will have two auxiliary sensors, namely, a motion sensor and a sound sensor (such as a microphone). When any of the auxiliary sensors is activated, this will trigger for the camera to begin recording.

In exemplary embodiments, the camera system includes a low power microcontroller that manages the state of the camera and a powerful camera processor that processes the images captured by the camera. The microcontroller manages the states of the camera so that the camera processor is enabled and capturing events based on inputs from the sensors mentioned herein. The microcontroller is a low power programmable device that is used to control the states of the ABR camera system. It manages the input from the sensors, and controls the camera subsystem depending on the sensor input. As will be explained later herein, the camera subsystem is the camera lens, the camera sensors and the camera processor.

When there are no significant events to be recorded, the microcontroller shuts down the camera processor to save power, and puts itself in a low power state to reduce power consumption. The microcontroller will monitor the sensors in low power state, and proceed to wake up and enable the camera processor based on the inputs from the sensors. The microcontroller is programmed to take the sensors' input to turn on the camera subsystem to enable video capture when significant events occur. The timer that is built into the microcontroller will signal to the microcontroller when the triggers from the sensors have expired or when no triggers occur and a predetermined time period has elapsed. When this happens, the microcontroller will shut down the camera subsystem, until the next triggers from the sensors arrive.

The timer is implemented in the microcontroller. It is used by the microcontroller to trigger the transition from a capture state to a low power state after some time has elapsed, in the event that the sensors do not detect any new activity.

In one example, an intelligent camera system can recognize that in a particular physical space, such as a conference room, there may be hours and hours of no activity in the daytime, but that at night during a certain time period, the conference room will have regularly scheduled activity in the form of cleaners cleaning the room.

In another example, the camera system can hear and detect a loud banging noise. The camera system can also detect that although there is a loud banging noise, no person is present in the physical space. Because the camera system is intelligent, it determines that the camera should begin to record audio and video simultaneously. The camera system has a camera sensor and complimentary auxiliary sensors (such as a PIR sensor and sound detect circuitry through a microphone) which help to detect if an activity is significant enough to be recorded by the camera system. The complimentary auxiliary sensors help to provide the intelligence in the camera system, since the PIR sensor can detect motion (such as the presence of a human being in a room) and the microphone can detect sound. The microphone's sensitivity level can be adjusted using a digital pod on the camera system. Furthermore, the decibel of sound can be controlled, detected and/or otherwise processed by instructions stored in a processor of the camera system.

Once one of the sensors detects a triggering event, the camera system will begin recording. Furthermore, after the camera system has detected the triggering event and has recorded a video recording, it can add additional video frames to the video recording. In exemplary embodiments, the camera system will prepend the additional video frames to the beginning of the video recording. For instance, the camera system can add two to five seconds of stored historical frames to the beginning of the video recording. Those stored historical video frames provide video prior to the detection of the triggering event. In some embodiments, those historical frames are stored in a buffer (such as in Random Access Memory (RAM)) associated with the camera, and can be added to the recording in a first in first out (FIFO) fashion. One skilled in the art will appreciate that any amount or time frame of historical frames of valuable data can be added to the video recording, and that the idea of adding two to five seconds of historical frames to a video recording is a non-limiting example.

In some embodiments, the camera system in the present disclosure can listen/detect sound or analyze infrared data, and after analyzing the data, the camera system can determine that a loud sound occurred and that a significant event occurred which triggers a video recording. The camera system will add the historical video frames to the video recording, thus providing the valuable data of the potentially significant event or activity to the user.

This is in contrast with conventional camera systems, which record events based on a simple enable/disable switch. A conventional camera system records if enabled; otherwise it does not record. When the conventional camera system is left enabled, it records all events, all the time. Usually only a small portion of all the recorded events is meaningful, but the amount of time required to shift through all the recordings is substantial. In addition, the "always on" recording by a conventional camera system generates an enormous amount of data, which requires significant bandwidth to transport and significant storage space. Furthermore, if the camera is battery powered, this "always on" mode consumes a great deal of power, significantly affecting the battery life of the device. Conversely, if the conventional camera is disabled, the user might miss some significant events. To prevent this, the user will always be forced to be on guard to manually enable the camera at the desired moment.

Thus, when an activity happens, such as motion, the conventional camera systems turn on and begin recording, but they traditionally miss the significant activity or event because of a lag time between the time it detected an activity and the time it began the video recording. Conventional camera systems may fail to record a portion or the entire significant event or activity, as they do not store historical video frames that can be added from the buffer to the video recording, or they may record insignificant events.

For instance, with conventional camera systems, a sound may occur, and when the conventional camera systems determined the sound, they begin to record. But because there is a delay between determining the sound and recording, conventional camera systems may have missed the important or significant activity or event altogether that should have been recorded.

FIG. 1 illustrates an environment 100 within which activity based recording for camera applications can be implemented, in accordance with some embodiments. The environment 100 may include a camera 102 containing a camera lens 104 and camera sensor(s) 106. The camera lens 104 can be a custom capsule-shaped camera lens. The camera 102 also includes complimentary auxiliary sensors, such as a microphone 107a and a passive infrared (PIR) sensor 107b. The microphone 107a serves as a sound capture device primarily. The microphone 107a also can detect noise levels above a certain threshold. Level control circuitry may be added to the microphone to allow the user to adjust the sound threshold level.

The PIR sensor 107b may be configured to sense or detect body heat, such as heat coming from the bodies of animals or humans. The PIR sensor 107b detects changes in heat in front of the camera without requiring power-hungry infrared Light Emitting Diodes (IR LEDs). The use of PIR sensors in a battery powered ABR system helps to extend the battery life of the system. Level control circuitry is added to the PIR sensor 107b to allow the user to adjust the PIR sensor sensitivity level.

In some embodiments, the camera lens 104 is a customized lens in front of or adjacent to the PIR sensor 107b, which creates a capsule or pill shape. Using a custom PIR solution (such as a discrete sensor and custom capsule-shaped capsule lens) allows one to have control over the product design, keeping in mind appropriate focal length with maximum range and wider field of view. The custom PIR solution also helps to reduce blind spots in far corners as per the orientation of the PIR sensor 107b. With this solution, the sensor is arranged in a perpendicular orientation to obtain the maximum depth sensitivity with the 110-degree field of view.

The camera 102 may be deployed in a physical space 108, such as a house. Though not explicitly shown in exemplary FIG. 1, the camera 102 also has one or more additional components in various embodiments that enable its operation for the purposes of the present disclosure.

The captured video 112 from the camera 102 may be transmitted via a network 110 to a cloud video analysis system 122, which may include a system for activity based recording 124. The cloud video analysis system 122 may further utilize a database 114 and one or more computing processors and volatile and non-volatile memory.

After processing the captured video 112, the system for activity based recording 124 may generate a finalized video recording 116, which is transmitted through network 110 to an application operating on a user device 118, which in turn can be viewed by a user 120. Each of these components is discussed in further detail below.

A camera 102 may be deployed in any physical space 108 to record audio and/or video around the physical space 108. While physical space 108 is depicted in exemplary FIG. 1 as a house, a person of ordinary skill in the art will understand that camera 102 may be deployed in any physical space, such as an office building, a conference room, a room, or any other space. Further, while only one camera 102 is depicted in FIG. 1 for simplicity, there can be any number of cameras in physical space 108. If multiple cameras are located in space 108, one or more of the cameras may be in wireless communication with one another, in exemplary embodiments. Further, while the camera 102 is depicted in FIG. 1 as a standalone device, in other embodiments, the camera 102 may be incorporated as a part of other electronic devices. For example, the camera 102 may be incorporated as part of a smartphone, tablet, intelligent personal assistant, or other smart electronic device.

Figure 2:
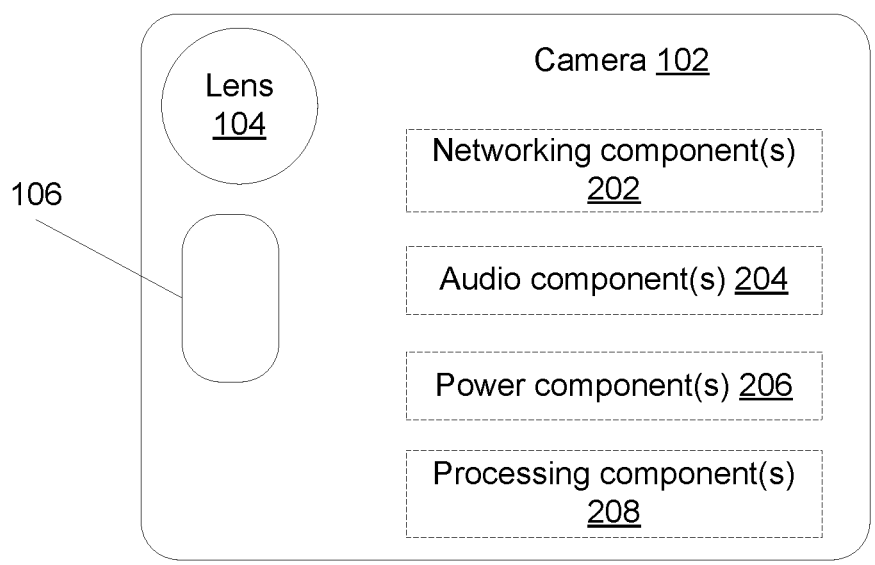
FIG. 2 illustrates an exemplary camera that can be used for activity based recording.

The camera 102 is described in further detail with respect to FIG. 2. In various embodiments, the camera 102 is a consumer-friendly camera that can be utilized by a human user without needing to have any specialized camera expertise. The camera 102 may have one or more lens 104, with which video is captured. In some embodiments, the lens 104 may be any type of lens typically found in consumer cameras, such as a standard prime lens, zoom lens, and wide angle lens. In a further embodiment, the lens 104 can be a custom capsule lens, as earlier described herein.

One skilled in the art may recognize that the camera 102 has one or more sensors. The sensors of the ABR camera system may be used to "wake up" the camera subsystem from a low power state, so that it may proceed in capturing video and audio data. The sensor(s) may be any type of sensor to monitor conditions around the camera 102. By way of non-limiting example, the sensor 106 may comprise one or more of a camera sensor 106, a PIR (passive infrared) sensor 107b that can bring to life colored night vision, a motion sensor, a temperature sensor, a humidity sensor, a GPS, etc. Another example of the sensor is the sound circuitry in a microphone 107a. The microphone 107a can be an omnidirectional microphone. The microphone can be a focused directional microphone. As would be understood by persons of ordinary skill in the art, other types of sensors can be utilized to preset other types of conditions or triggers as well for the camera 102.

One skilled in the art may appreciate that the camera system may have any number of auxiliary sensors, and that such auxiliary sensors can turn a camera itself or a video recording on or off. For instance, an exemplary auxiliary sensor is an accelerometer that could inform the user a number of things. It could tell the user if a person picked up the camera, if the camera had been moved, if an earthquake happened, or if a person had approached from behind to remove the camera from the user. Using the accelerometer, the camera system can use motion detection to turn on the camera to record. The camera system can also send a message, alert, or message notification to the user that their camera was moved, which could be defined as a form of activity. This in itself can be an activity based recording.

Referring to FIG. 2, the camera 102 has additional components that enable its operation. For example, the camera 102 may have power component(s) 206. Power component(s) 206 may comprise an electrical connector interface for electronically coupling a power source to, or for providing power to the camera 102. Electrical connector interface may comprise, for example, an electrical cable (the electrical cable can be any of a charging cable, a FireWire cable, a USB cable, a micro-USB cable, a lightning cable, a retractable cable, a waterproof cable, a cable that is coated/covered with a material that would prevent an animal from chewing through to the electrical wiring, and combinations thereof), electrical ports (such as a USB port, micro-USB port, microSD port, etc.), a connector for batteries (including rechargeable battery, non-rechargeable battery, battery packs, external chargers, portable power banks, etc.), and any other standard power source used to provide electricity/power to small electronic devices.

In an exemplary embodiment, the power component(s) 206 comprises at least one battery provided within a housing unit.

The camera 102 also comprises an audio component(s) 204. In various embodiments, the audio component(s) 204 may comprise one or more microphones for receiving, recording, and transmitting audio.

The camera 102 further has processing component(s) 208 to enable it to perform processing functions discussed herein. The processing component(s) 208 may comprise at least one processor, static or main memory, and software such as firmware that is stored on the memory and executed by a processor. The processing component(s) 208 may further comprise a timer that operates in conjunction with the functions disclosed herein. As previously mentioned, the camera lens 104, the camera sensor 106 and a camera processor 208 may collectively be called the camera subsystem.

In various embodiments, a specialized video processor is utilized with a hardware accelerator and specially programmed firmware to identify triggering events, begin recording audio and/or video (in either Standard Definition or High Definition), cease recording of audio and/or video, process the captured video frames and insert metadata information regarding the specific video frame(s), and transmit the recorded audio, video, and metadata to a video analysis system 122 operating via software in a cloud computing environment.

The camera 102 also comprises a networking component(s) 202, to enable the camera 102 to connect to the network 110 in wireless manner, similar to networking capabilities utilized by persons of ordinary skill in the art. Further, networking component(s) 202 may also allow for remote control of the camera 102.

In various embodiments, the networking communication capability of the camera 102 can be achieved via an antenna attached to any portion of the camera 102, and/or via a network card. The camera 102 may communicate with network 110 via wired or wireless communication capabilities, such as radio frequency, Bluetooth, ZigBee, Wi-Fi, electromagnetic wave, RFID (radio frequency identification), etc.

A human user 120 may further interact with, and control certain operations of the camera 102 via a graphical user interface displayed on a user device 118. The graphical user interface can be accessed by the human user 120 via an application on the user device 118 (such as a desktop or laptop computer, netbook, smartphone, tablet, etc.). The human user 120 may further interact with, and control certain operations of the camera 102 via a dedicated software application on a smartphone, tablet, smartwatch, laptop or desktop computer, or any other computing device with a processor that is capable of wireless communication. In other embodiments, the human user 120 can interact with and control certain operations of the camera 102 via a software application utilized by the human user 120 for controlling and monitoring other aspects of a residential or commercial building, such as a security system, home monitoring system for Internet-enabled appliances, voice assistant such as Amazon Echo, Google Home, etc.

Returning to FIG. 1, the camera 102 captures video as discussed herein. The captured video 112 is then transmitted to a video analysis system 122 via the network 110. The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection.

Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network can further include or interface with any one or more of an RS-232 serial connection, an IEEE-1394 (FireWire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking.

The network 110 may be a network of data processing nodes that are interconnected for the purpose of data communication. The network 110 may include any suitable number and type of devices (e.g., routers and switches) for forwarding commands, content, requests, and/or responses between each user device 118, each camera 102, and the video analysis system 122.

The video analysis system 122 may include a server-based distributed software application. Thus the video analysis system 122 may include a central component residing on a server and one or more client applications residing on one or more user devices and communicating with the central component via the network 110. The user 120 may communicate with the video analysis system 122 via a client application available through the user device 118.

The video analysis system 122 may comprise software application(s) for processing captured video 112, as well as other capabilities. The video analysis system 122 is further in communication with one or more data structures, such as a database 114. In exemplary embodiments, at least some components of the video analysis system 122 operate on one or more cloud computing devices or servers.

The video analysis system 122 further comprises a system for activity based recording 124. The system for activity based recording 124 analyzes the captured video 112 and metadata associated with the captured video 112. Also, the system for activity based recording 124 will add historical video frames to the captured video 112. The step of adding historical video frames to the captured video 112 can occur prior to an analysis of the captured video 112. In some embodiments, the added historical video frames are those video frames that were stored in a buffer (RAM). The video frames can be time-stamped, such that video frames of a predetermined time preceding the start of the captured video can be added by the system for activity based recording 124. The adding of the historical video frames to the captured video results in a finalized video recording 116. The finalized video recording 116 is then transmitted by system for activity based recording 124, through network 110, to a user device 118, at which point it can be viewed by a user. In some embodiments, additional information may be transmitted with the finalized video recording 116, such as a copy of the face image from the captured video 112, and/or other information associated with the captured video 112 or the finalized video recording 116.

The finalized recording 116 is displayed via a user interface on a screen of user device 118, in the format of a pop-up alert, text message, e-mail message, or any other means of communicating with user 120.

The user device 118, in some example embodiments, may include a Graphical User Interface for displaying the user interface associated with the system 122. The user device 118 may include a mobile telephone, a desktop personal computer (PC), a laptop computer, a smartphone, a tablet, a smartwatch, intelligent personal assistant device, smart appliance, and so forth.

Figure 3:
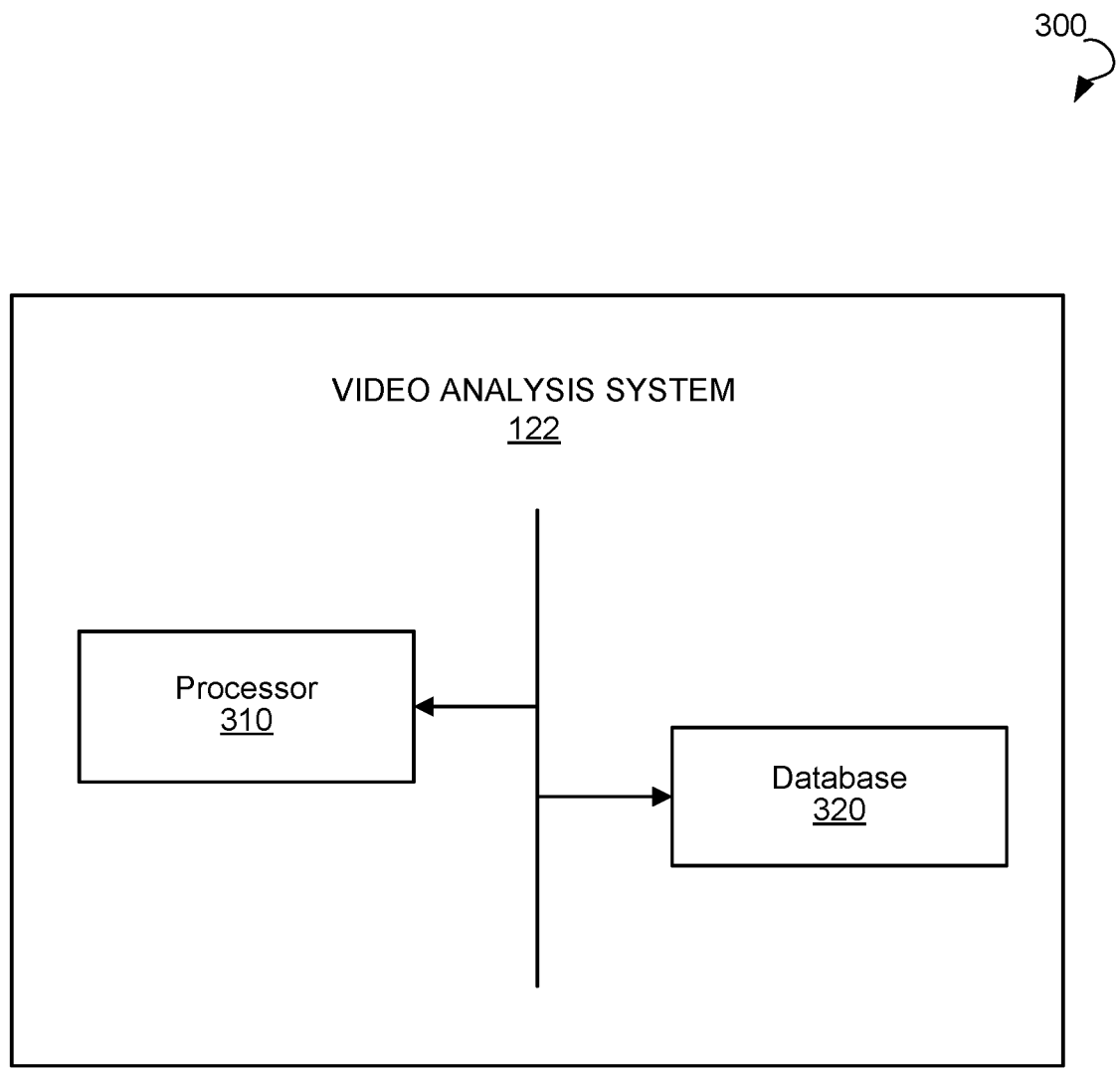
FIG. 3 is a block diagram showing various modules of a video analysis system, in accordance with certain embodiments.

FIG. 3 is a block diagram showing various modules of a video analysis system 122 for processing captured video 112, in accordance with certain embodiments. The system 122 may include a processor 310 and a database 320. The database 320 may include computer-readable instructions for execution by the processor 310. The processor 310 may include a programmable processor, such as a microcontroller, central processing unit (CPU), and so forth. In other embodiments, the processor 310 may include an application-specific integrated circuit or programmable logic array, such as a field programmable gate array, designed to implement the functions performed by the system 122. In various embodiments, the system 122 may be installed on a user device or may be provided as a cloud service residing in a cloud storage. The operations performed by the processor 310 and the database 320 are described in further detail herein.

Figure 4:
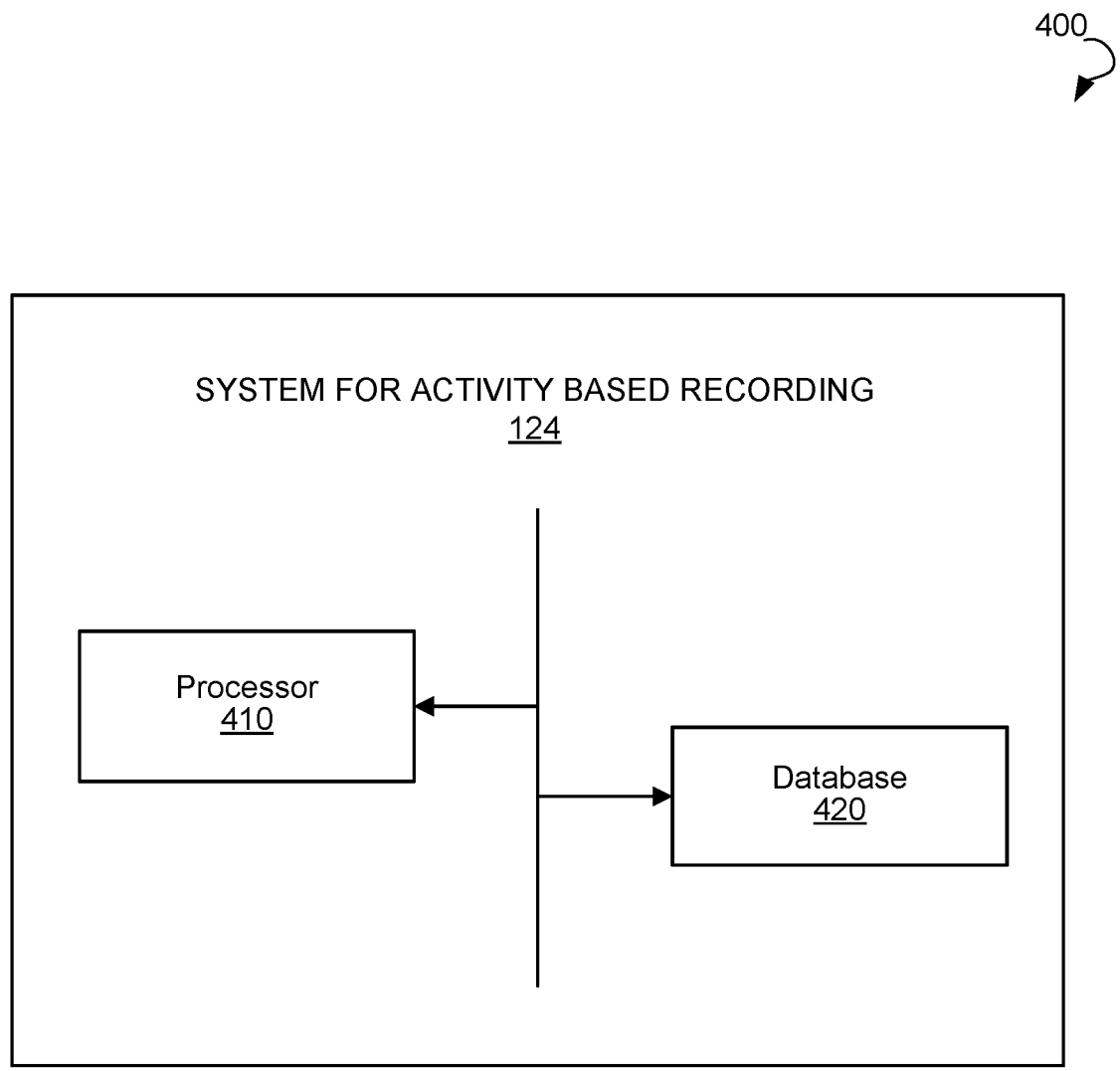
FIG. 4 is a block diagram showing various modules of a system for activity based recording, in accordance with certain embodiments.

FIG. 4 is a block diagram showing various modules of a system for activity based recording 124, in accordance with certain embodiments. The system 124 may include a processor 410 and a database 420. The processor 410 of the system for activity based recording 124 may be the same, or different from processor 310 of the video analysis system 122. Further, the database 420 of the system for activity based recording 124 may be the same or different than the database 320 of the video analysis system 122.

The database 420 may include computer-readable instructions for execution by the processor 410. The processor 410 may include a programmable processor, such as a microcontroller, central processing unit (CPU), and so forth. In other embodiments, the processor 410 may include an application-specific integrated circuit or programmable logic array, such as a field programmable gate array, designed to implement the functions performed by the system for activity based recording 124. In various embodiments, the system for activity based recording 124 may be installed on a user device or may be provided as a cloud service residing in a cloud storage. The operations performed by the processor 410 and the database 420 are described in further detail herein.

Figure 5:
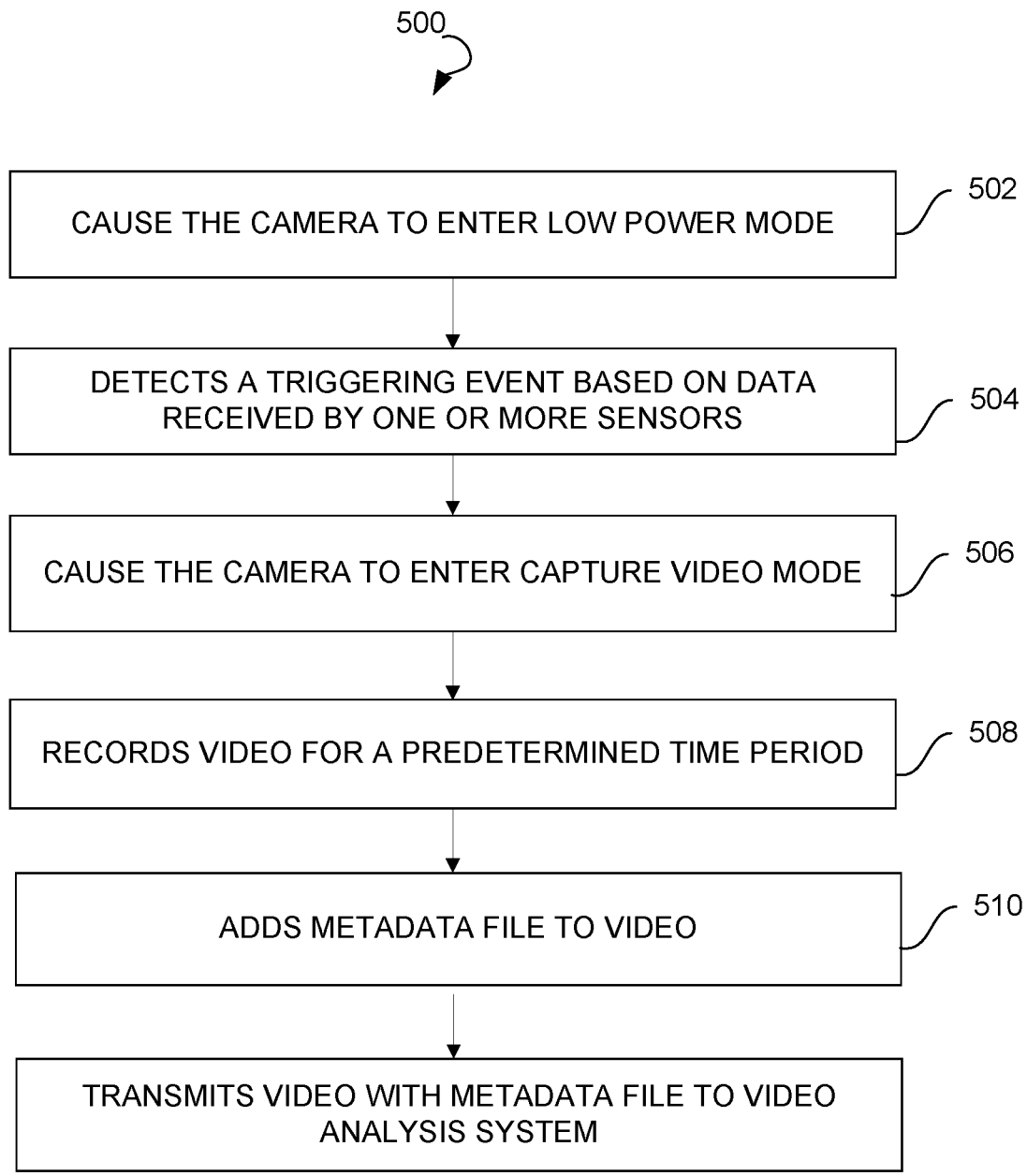
FIG. 5 is a process flow diagram showing a method for activity based recording, according to an example embodiment.

FIG. 5 is a process flow diagram showing a method 500 for activity based recording via a camera system, within the environment described with reference to FIG. 1. In some embodiments, the operations may be combined, performed in parallel, or performed in a different order. The method 500 may also include additional or fewer operations than those illustrated. The method 500 may be performed by processing logic that may comprise hardware (e.g., decision making logic, dedicated logic, programmable logic, and microcode), hardware accelerator, software (such as firmware on camera 102 or other software run on a special-purpose computer system), or any combination of the above.

The method 500 may commence with the user turning on the camera 102. When the user turns on the camera, the camera system boots and the camera enters a low power mode 502 to save on power consumption. In some embodiments, a first processor and a first memory causes the camera to enter the low power mode. Then, the camera system waits and "listens" for a trigger while in low power mode. At this stage, the camera subsystem is powered down.

Then, the camera system detects a triggering event based on data received by one or more sensors of the camera system at operation 504. In some embodiments, the sensors include the camera sensor, the PIR sensor and the microphone. The triggering event may be detected by one or more sensors, including the complimentary auxiliary sensors, in the camera system. In an example, the camera system includes a camera sensor and two complimentary auxiliary sensors, namely, a passive IR sensor and a microphone. The passive IR sensor is configured to receive information, such as detecting motion. In some embodiments, the microphone of the camera system can detect analog sound, which enters into a transducer for the analog sound to be converted into digital.

In an exemplary embodiment, the camera system utilizes all three sensors (the camera (CMOS) sensor, the passive IR sensor and the microphone). All three sensors work in concert to detect motion, listen for sounds, detect heat (such as body heat), detect changes in temperature, and analyze an image of a space or room to see if there is a change in the space or room that triggers a recording. In other words, all three sensors work in concert to determine if there has been activity. It will be understood by those skilled in the art that the camera system can use various combinations and permutations of complimentary sensors and a camera to detect activity. That being said, primarily the sensors in the camera system are configured to trigger a recording.

As discussed herein, the camera 102 may be located in a physical space 108 and powered on, but not be actively recording video and/or audio. A triggering event may cause camera 102 to begin recording. The triggering event can be any preset condition or trigger.

In an example embodiment, the triggering event is a noise detected by a microphone on camera 102 above a certain decibel threshold. The camera system 102 may include time and/or decibel profiles for the auxiliary camera sensors. In another example embodiment, a triggering event is a noise detected by a microphone on camera 102 within a certain time period. In other example embodiments, a triggering event may be the detection of motion, temperature, smoke, humidity, gaseous substance, or any other environmental condition above a preset threshold, or occurring within a preset time period. The preset threshold may be configured by a manufacturer of the camera 102, or configured by a user 120.

Upon detection of the triggering event, the camera 102 enters capture video and/or audio mode at operation 506 for a certain predetermined time period. In some embodiments, the first processor and the first memory causes the camera to enter the capture video mode. When the camera 102 is in captured mode, the camera subsystem is powered on. In some embodiments, the capture mode may be enabled on camera 102 for an amount of time that is pre-configured by a manufacturer of camera 102, or pre-configured by a user 120. Further, the predetermined time period that capture mode is enabled on camera 102 may be variable based on the type of triggering event, time of day, or any other criterion. In an exemplary embodiment, capture mode is enabled on camera 102 for 5-30 seconds.

At operation 508, video is recorded by camera 102 onto memory within camera 102 hardware, resulting in a captured video. The predetermined time period for recording video in response to detecting the triggering event may be less than one minute. Further, substantially simultaneously, recorded video is processed by firmware on a specialized video processor hardware and/or hardware accelerator within camera 102. The firmware processes recorded video. It also may optionally detect select video frames within the recorded video that contain a human face or are likely to contain a human face, as further explained in U.S. Nonprovisional patent application Ser. No. 16/163,521, filed on Oct. 17, 2018, and entitled "Automatic Object Detection and Recognition Via a Camera System," which is incorporated herein by reference.

If new triggers are detected, the camera remains in capture mode and video continues to be recorded. In some embodiments, the video is recorded by the camera 102 until no trigger or no triggering event is detected by the one or more sensors, and the predetermined time period for capturing video has elapsed. Once the video recording has stopped, the camera system enters in the low power mode and the camera system waits and "listens" for the next trigger to signal that a further video recording should take place. Thus, one skilled in the art may appreciate that steps of the method 500 may be repeated in a loop, producing multiple videos of potentially significant events or activities while the camera system is operational.

Information regarding the video recording is added to metadata associated with the video recording, at operation 510. Such information may include the date and time that the video clip was taken. Other information may include the spatial location of the camera at the time that the video clip was taken and/or information of which sensor(s) associated with the camera triggered the video recording.

Subsequently, the captured or recorded video and the metadata file are transmitted to the video analysis system 122 for further analysis, at operation 510. The metadata file may include data that was received from the one or more of the camera sensors. In various embodiments, the camera 102 is in wireless communication with video analysis system 122 and the operation 510 occurs in a wireless manner. In other embodiments, the transmission occurs via a wired communication network. In still further embodiments, the video analysis system 122 may be executed by a module within the camera 102 itself.

Figure 6:
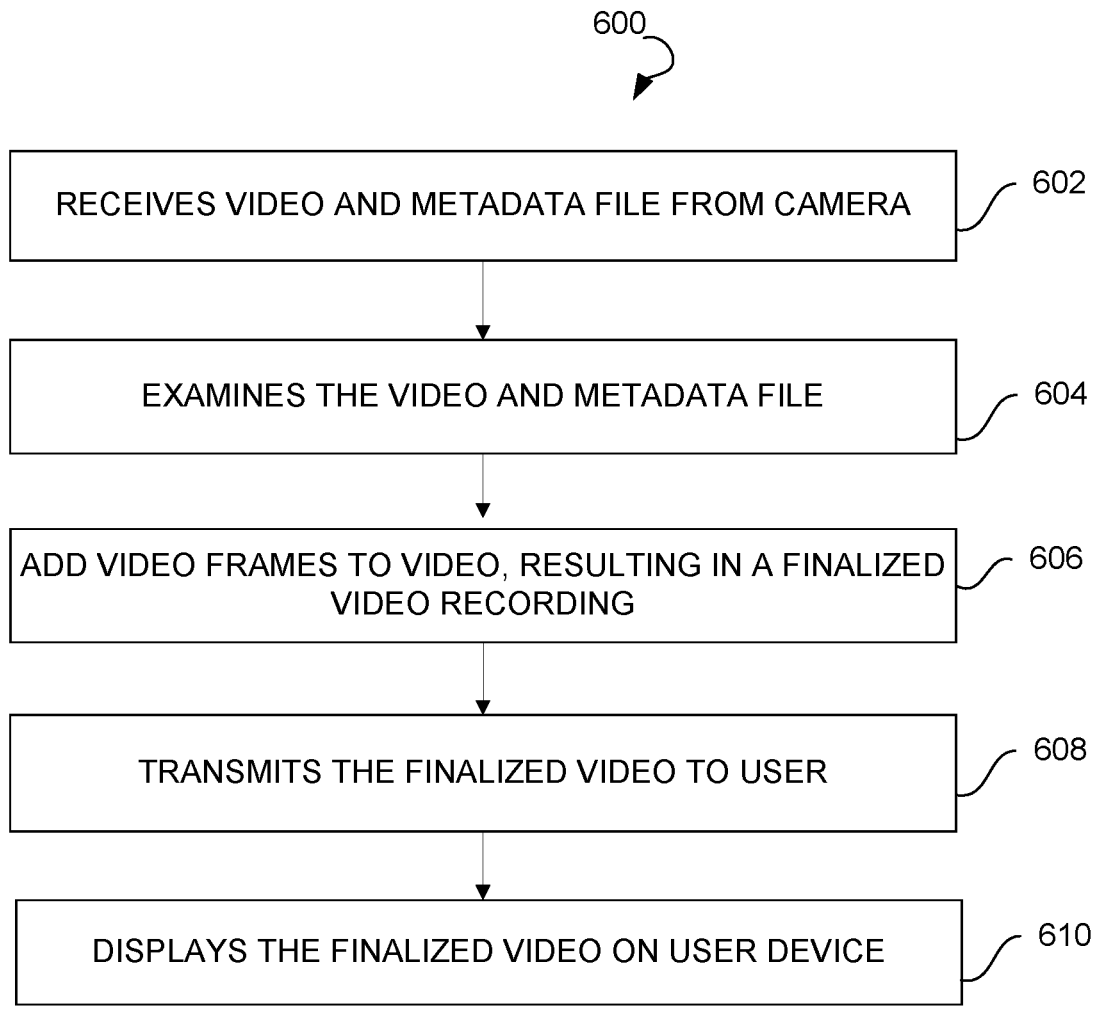
FIG. 6 is a process flow diagram showing a method for activity based recording via a camera system, according to an example embodiment.

FIG. 6 is a process flow diagram showing a method 600 for activity based recording via a camera system, within the environment described with reference to FIG. 1. In some embodiments, the operations may be combined, performed in parallel, or performed in a different order. The method 600 may also include additional or fewer operations than those illustrated. The method 600 may be performed by processing logic that may comprise hardware (e.g., decision making logic, dedicated logic, programmable logic, and microcode), hardware accelerator, software (such as firmware or other software run on a special-purpose computer system or general purpose computer system), or any combination of the above.

Various operations of method 600 may be performed by video analysis system 122, the system for activity based recording 124, or a combination of both systems.

The method 600 may commence at operation 602 with the video analysis system 122 receiving the captured video and/or audio, along with corresponding metadata from the camera 102. As discussed herein, the recorded video may be a video clip of any duration. The recorded video and corresponding metadata may be received from the camera 102 via any wireless or wired communication mechanism.

At operation 604, the video analysis system 122 examines the captured video and the metadata file received. In some embodiments, the video analysis system 122 does this to determine the date and/or time that the captured video was taken. Such metadata may result in a time stamp of the captured video. During operation 604, the video analysis system 122 may also optionally determine the one or more sensors that triggered the recording of the captured video. The video analysis system 112 may optionally determine what is the potentially significant event or activity depicted in the captured video, to provide further information or data to the user in a notification, message or alert sent to their user computing device.

At operation 606, the system for activity based recording 124 adds video frames to the captured video, resulting in a finalized video recording. The additional video frames are typically added to the beginning of the captured video, and it may be for any time duration. By way of a non-limiting example, the additional video frames are those frames that were captured 2-5 seconds prior to the time that the recording of the captured video commenced. In other words, the additional video frames may be historical frames that were stored a few seconds prior to the detection of the triggering event that activated the recording of the captured video. Such historical videos frames are typically stored in a buffer (RAM), and they can be added to the beginning of the captured video in a first in first out (FIFO) fashion, resulting in a finalized video recording.

The system for activity based recording 124 may also process the received captured video. Such processing may optionally entail verifying whether a human face is detected by the camera in the captured video. The processing may further entail identifying the detected human face certain video frames. This process is referred to as recognizing the human face as explained in U.S. Nonprovisional patent application Ser. No. 16/163,521, filed on Oct. 17, 2018, and entitled "Automatic Object Detection and Recognition Via a Camera System," which is incorporated herein by reference.

The finalized video recording 116 is transmitted to user 120 at operation 608, and displayed on a user device 118 at operation 610. The finalized video recording 116 may be partially or fully displayed on a user interface of user device 118 via a pop-up notification, text message, e-mail message, via a web browser operating on user device 118, or via a dedicated software application operating on user device 118.

Figure 7:
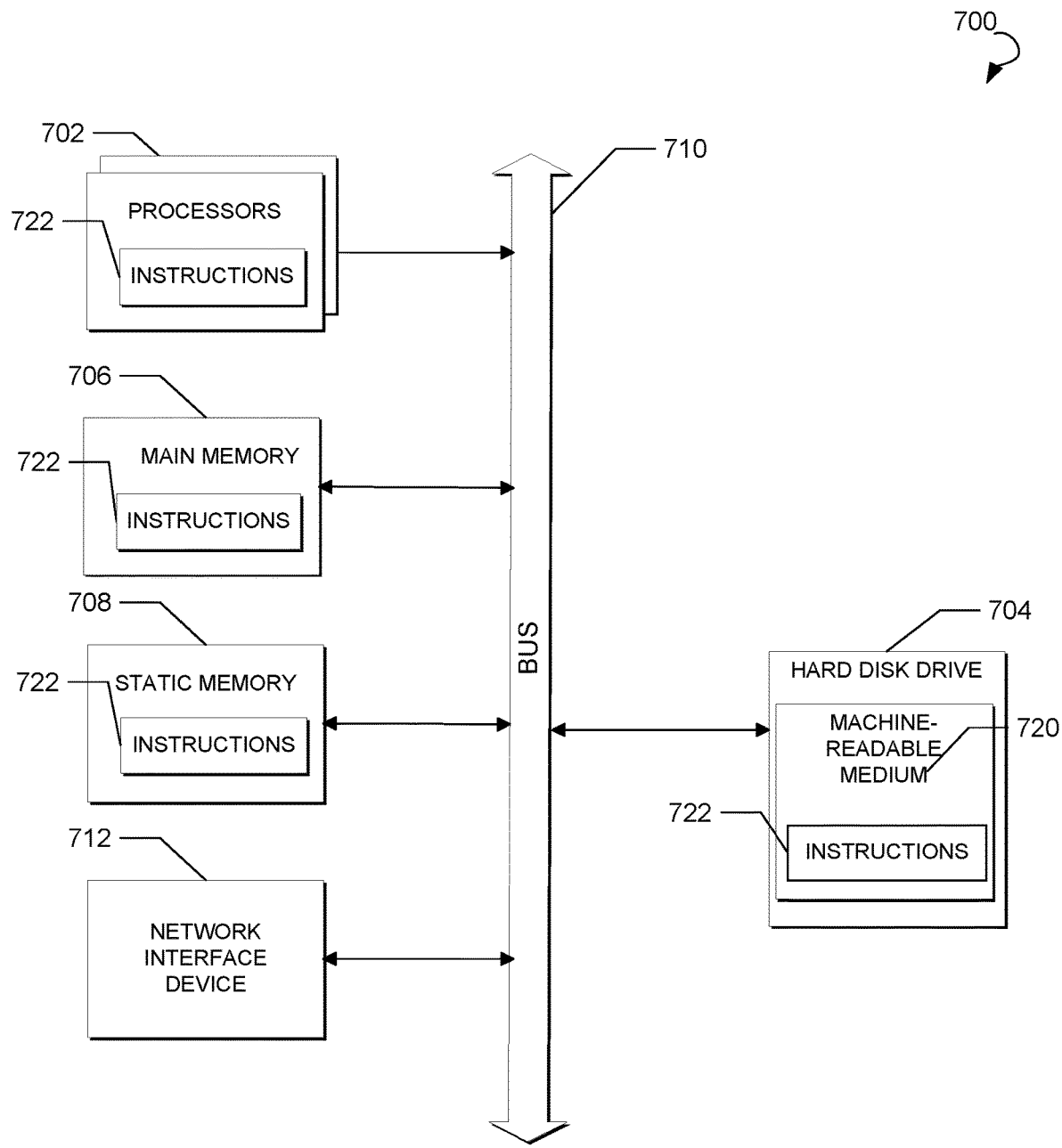
FIG. 7 is a schematic diagram of an example computing system that may be used to implement embodiments disclosed in accordance with the present disclosure.

FIG. 7 shows a diagrammatic representation of a computing device for a machine in the exemplary electronic form of a computer system 700, within which a set of instructions for causing the machine to perform any one or more of the methodologies discussed herein can be executed. The computer system 700 may be implemented within the camera 102, the video analysis system 122, and/or system for activity based recording 124.

In various exemplary embodiments, the computing device operates as a standalone device or can be connected (e.g., networked) to other computing devices. In a networked deployment, the computing device can operate in the capacity of a server or a client machine in a server-client network environment, or as a peer machine in a peer-to-peer (or distributed) network environment. The computing device can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single computing device is illustrated, the term "computing device" shall also be taken to include any collection of computing devices or computers that individually or jointly execute a set (or multiple sets) of instructions to perform any one or more of the methodologies discussed herein.

The example computer system 700 includes a processor or multiple processors 702, a hard disk drive 704, a main memory 706, and a static memory 708, which communicate with each other via a bus 710. The computer system 700 may also include a network interface device 712. The hard disk drive 704 may include a computer-readable medium 720, which stores one or more sets of instructions 722 embodying or utilized by any one or more of the methodologies or functions described herein. The instructions 722 can also reside, completely or at least partially, within the main memory 706 and/or within the processors 702 during execution thereof by the computer system 700. The main memory 706 and the processors 702 also constitute machine-readable media.

While the computer-readable medium 720 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 700 may be implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk, any other optical medium, any other physical medium with patterns of marks or holes, a RAM, a Programmable Read-Only Memory, an Erasable Programmable Read-Only Memory (EPROM), an Electrically Erasable Programmable Read-Only Memory, a FlashEPROM, any other memory chip or data exchange adapter, a carrier wave, or any other medium from which a computer can read.

Thus, computer-implemented methods and systems for activity based recording are described herein. As would be understood by persons of ordinary skill in the art, while the present disclosure describes activity based recording for camera applications, the present disclosure may similar be utilized for activity based recording for other applications.

Although embodiments have been described herein with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for activity based recording via a camera system, the system comprising:
   a camera comprising:
      a lens;
      a camera sensor;
      a passive infrared (PIR) sensor;
      a microphone; and
      a first processor and a first memory, configured to:
         cause the camera to enter a low power mode;
         detect a triggering event in a physical space around the camera based upon first data received from one or more of the PIR sensor and the microphone;
         cause the camera to enter a capture video mode comprising a variable enabled period based on a detected type of the triggering event, the variable enabled period comprising a predetermined period for the camera to remain in the capture video mode for the detected type of triggering event, the type of triggering event detected being one from a plurality of types of triggering events;
         record video in response to detecting the triggering event, resulting in a captured video;
         store at least some of the video frames of the captured video in a buffer;
         detect another triggering event in the physical space around the camera based upon second data received from the camera sensor;
         record another video for a predetermined time period, in response to detecting the another triggering event, resulting in another captured video; and
         transmit the at least some of the video frames and the another captured video with a metadata file associated with the another captured video to a video analysis system, the metadata file including at least some of the second data; and
   the video analysis system comprising:
      a second processor and a second memory, the second processor configured to:
         receive the at least some of the video frames, the another captured video, and the metadata file from the camera;
         examine the another captured video, based on information in the metadata file;
         add the at least some of the video frames to the another captured video, resulting in a finalized video recording; and
         transmit the finalized video recording to a user computing device in communication with the video analysis system.

2. The camera system of claim 1, wherein the another captured video further comprises audio.

3. The camera system of claim 1, wherein the detected triggering event is a loud noise in the physical space around the camera that is detected by the microphone.

4. The camera system of claim 1, wherein the detected triggering event is a movement in the physical space around the camera that is detected by at least one sensor.

5. The camera system of claim 1, further comprising an accelerometer that can detect a triggering event in the physical space around the camera.

6. The camera system of claim 1, wherein the lens is a custom capsule lens positioned in front of the PIR sensor.

7. The camera system of claim 1, wherein the first processor is a specialized video processor.

8. The camera system of claim 1, wherein the video analysis system further comprises a database communicatively coupled to the second processor.

9. The camera system of claim 1, wherein the adding the at least some of the video frames further comprises prepending the at least some of the video frames to a beginning of the another captured video.

10. The camera system of claim 1, wherein the plurality of types of triggering events comprise noise, motion, temperature, smoke, humidity, and gaseous substances detectable in the physical space around the camera system.

11. The camera system of claim 1, wherein the second processor is configured to prepend a plurality of time-stamped historical video frames to the recorded video.

12. A method for activity based recording via a camera system, the camera system including a camera, a camera sensor, a passive infrared (PIR) sensor, and a microphone, the method comprising:
   causing the camera to enter a low power mode;
   detecting a triggering event in a physical space around the camera based upon first data received from one or more of the PIR sensor and the microphone;
   causing the camera to enter a capture video mode comprising a variable enabled period based on a detected type of the triggering event, the variable enabled period comprising a predetermined period for the camera to remain in the capture video mode for the detected type of triggering event, the type of triggering event detected being one from a plurality of types of triggering events;

recording video in response to detecting the triggering event, resulting in a captured video;

storing at least some of the video frames of the captured video in a buffer;

detecting another triggering event in the physical space around the camera based upon second data received from the camera sensor;

recording another video for a predetermined time period, in response to detecting the another triggering event, resulting in another captured video;

transmitting the at least some of the video frames and the another captured video with a metadata file associated with the another captured video to a video analysis system, the metadata file including at least some of the second data;

receiving the at least some of the video frames, the another captured video, and the metadata file from the camera;

examining the another captured video, based on information in the metadata file;

adding the at least some of the video frames to the another captured video, resulting in a finalized video recording; and transmitting the finalized video recording to a user computing device in communication with the camera.

13. The method of claim 12, wherein the detected triggering event is a loud noise in the physical space around the camera that is detected by the microphone.

14. The method of claim 12, wherein the detected triggering event is a movement in the physical space around the camera that is detected by at least one sensor.

15. The method of claim 12, wherein a first processor is a specialized video processor.

16. The method of claim 12, wherein the video analysis system further comprises a database communicatively coupled to a second processor.

17. The method of claim 12, wherein the predetermined time period is less than one minute.

18. The method of claim 12, wherein the camera system further includes a custom capsule lens positioned in front of the PIR sensor.

19. The method of claim 12, wherein the adding the at least some of the video frames further comprises prepending the at least some of the video frames to a beginning of the another captured video.

20. The method of claim 12, wherein the plurality of types of triggering events comprise noise, motion, temperature, smoke, humidity, and gaseous substances detectable in the physical space around the camera system.

21. The method of claim 12, further comprising prepending a plurality of time-stamped historical video frames to the recorded video.

22. A system for activity based recording via a camera system, the system comprising:
 a camera comprising:
  a lens;
  a camera sensor;
  a passive infrared (PIR) sensor;
  a microphone; and
  an accelerometer;
  a first processor and a first memory, configured to:
   cause the camera to enter a low power mode;
   detect a triggering event in a physical space around the camera based upon first data received from one or more of the PIR sensor, the microphone, and the accelerometer;
   cause the camera to enter a capture video mode comprising a variable enabled period based on a detected type of the triggering event, the variable enabled period comprising a predetermined period for the camera to remain in the capture video mode for the detected type of triggering event, the type of triggering event detected being one from a plurality of types of triggering events;
   record video in response to detecting the triggering event, resulting in a captured video;
   store at least some of the video frames of the captured video in a buffer;
   detect another triggering event in the physical space around the camera based upon second data received from the camera sensor;
   record another video for a predetermined time period, in response to detecting the another triggering event, resulting in another captured video; and
   transmit the at least some of the video frames and the another captured video with a metadata file associated with the another captured video to a video analysis system, the metadata file including at least some of the second data; and
 the video analysis system comprising:
  a second processor and a second memory, the second processor configured to:
   receive the at least some of the video frames, the another captured video, and the metadata file from the camera;
   examine the another captured video, based on information in the metadata file;
   add the at least some of the video frames to the another captured video, resulting in a finalized video recording; and
   transmit the finalized video recording to a user computing device in communication with the video analysis system.

* * * * *